BEST AVAILABLE COPY

Dec. 9, 1930. A. STOCKSTROM Des. Re. 17,900

RANGE OR SIMILAR ARTICLE

Original Filed April 3, 1929

Inventor

By Arthur Stockstrom
Pattison, Wright & Pattison
Attorneys

Reissued Dec. 9, 1930

Des. Re. 17,900

UNITED STATES PATENT OFFICE

ARTHUR STOCKSTROM, OF ST. LOUIS, MISSOURI, ASSIGNOR TO AMERICAN STOVE COMPANY, OF ST. LOUIS, MISSOURI, A CORPORATION OF NEW JERSEY

DESIGN FOR A RANGE OR SIMILAR ARTICLE

Original No. 79,110, dated July 30, 1929, Serial No. 30,730, filed April 3, 1929, for 14 years. Application for reissue filed June 9, 1930. Serial No. 36,002. Term of patent 14 years.

*To all whom it may concern:*

Be it known that I, ARTHUR STOCKSTROM, a citizen of the United States, residing in the city of St. Louis and State of Missouri, have invented a new, original, and ornamental Design for a Range or Similar Article, of which the following is a specification, reference being had therein to the accompanying drawings.

Figure 1:
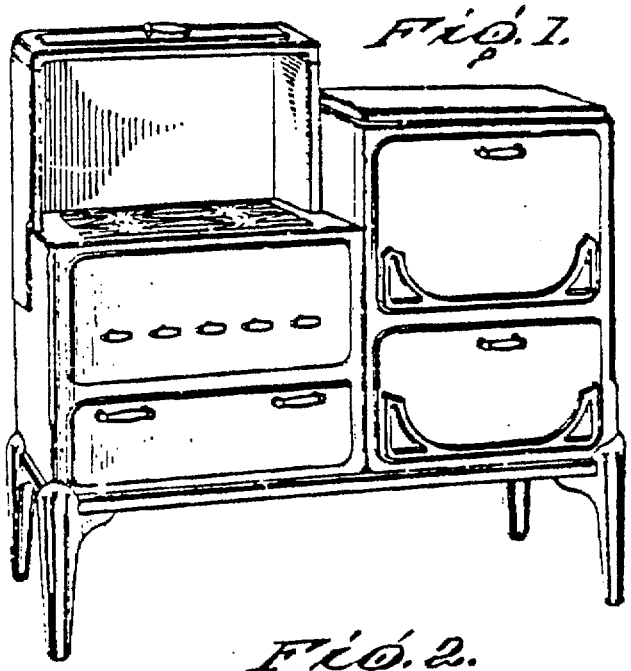
Figure 1 is a perspective view of my new design for a range, the same being shown in open position.
Figure 2:
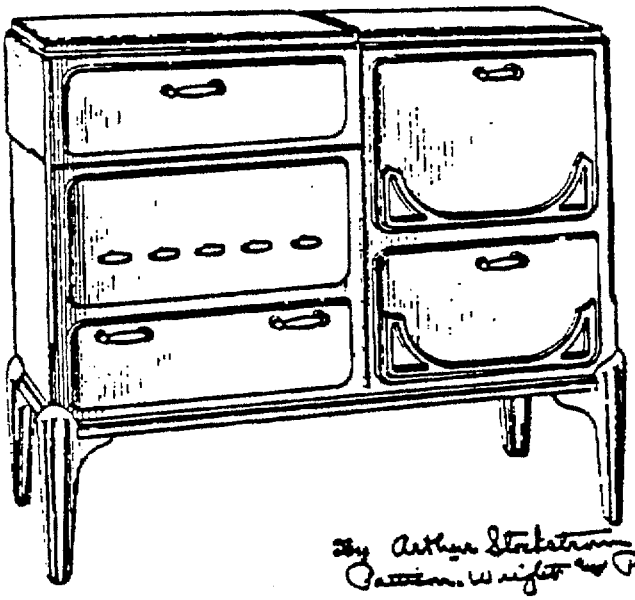
Figure 2 is a perspective view showing my new design, the parts being shown in a closed position.

I claim:

The ornamental design for a range or similar article as shown.

In testimony whereof I hereunto affix my signature.

ARTHUR STOCKSTROM.